May 7, 1929.  C. T. SMALL  1,712,234
CAN CAPPING MACHINE
Filed April 4, 1927   10 Sheets-Sheet 4

INVENTOR
C.T.SMALL

BY *E. E. Huffman*

ATTORNEY

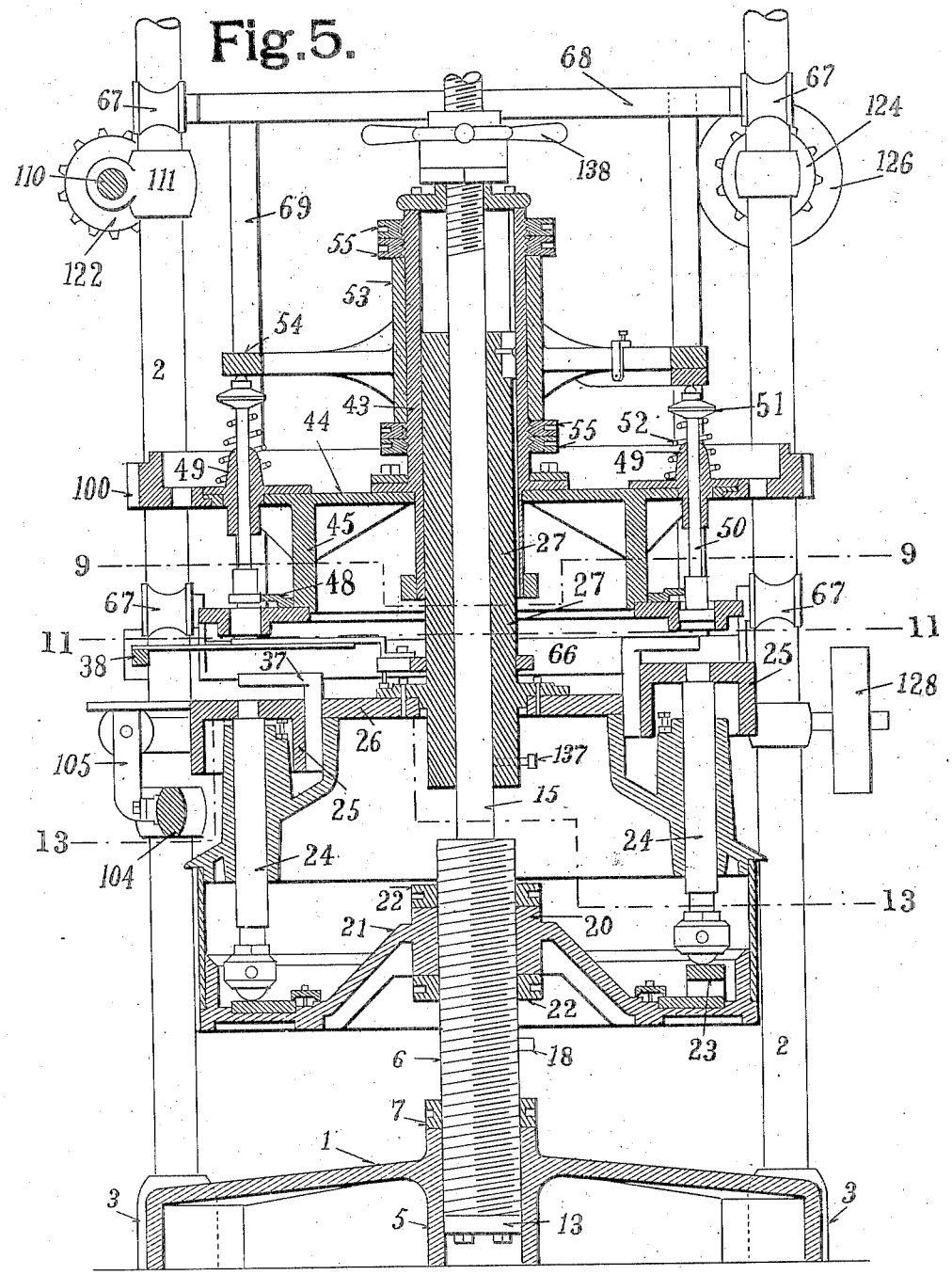

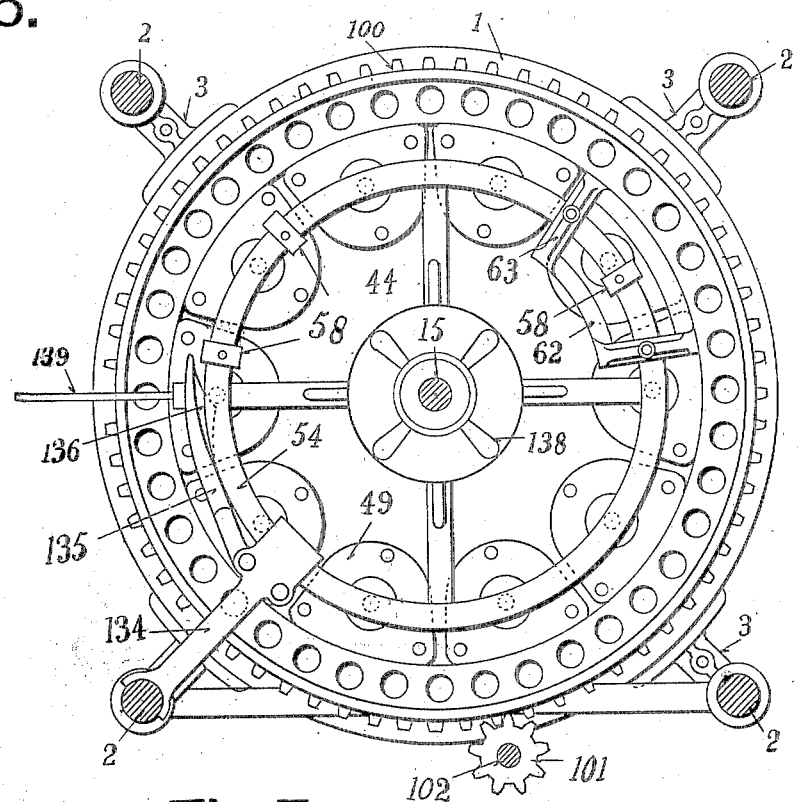
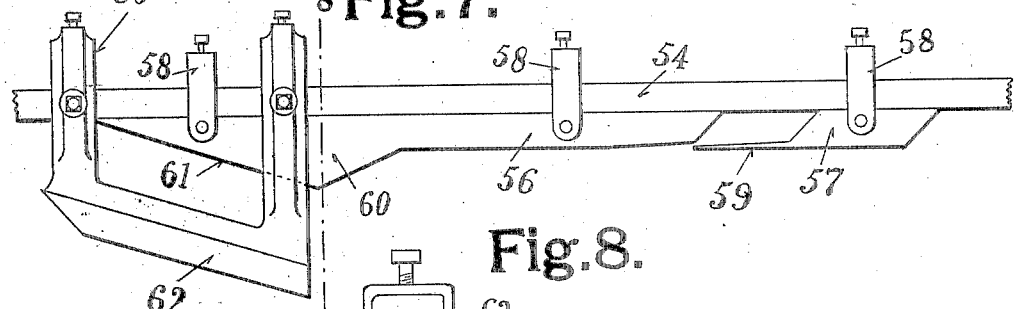
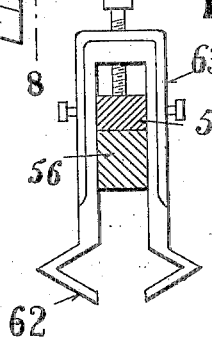

May 7, 1929.　　　　C. T. SMALL　　　　1,712,234
CAN CAPPING MACHINE
Filed April 4, 1927　　　10 Sheets-Sheet 7

INVENTOR
C. T. SMALL
BY
ATTORNEY

May 7, 1929.  C. T. SMALL  1,712,234
CAN CAPPING MACHINE
Filed April 4, 1927    10 Sheets-Sheet 8

INVENTOR
C.T.SMALL
BY E. A. Huffman
ATTORNEY

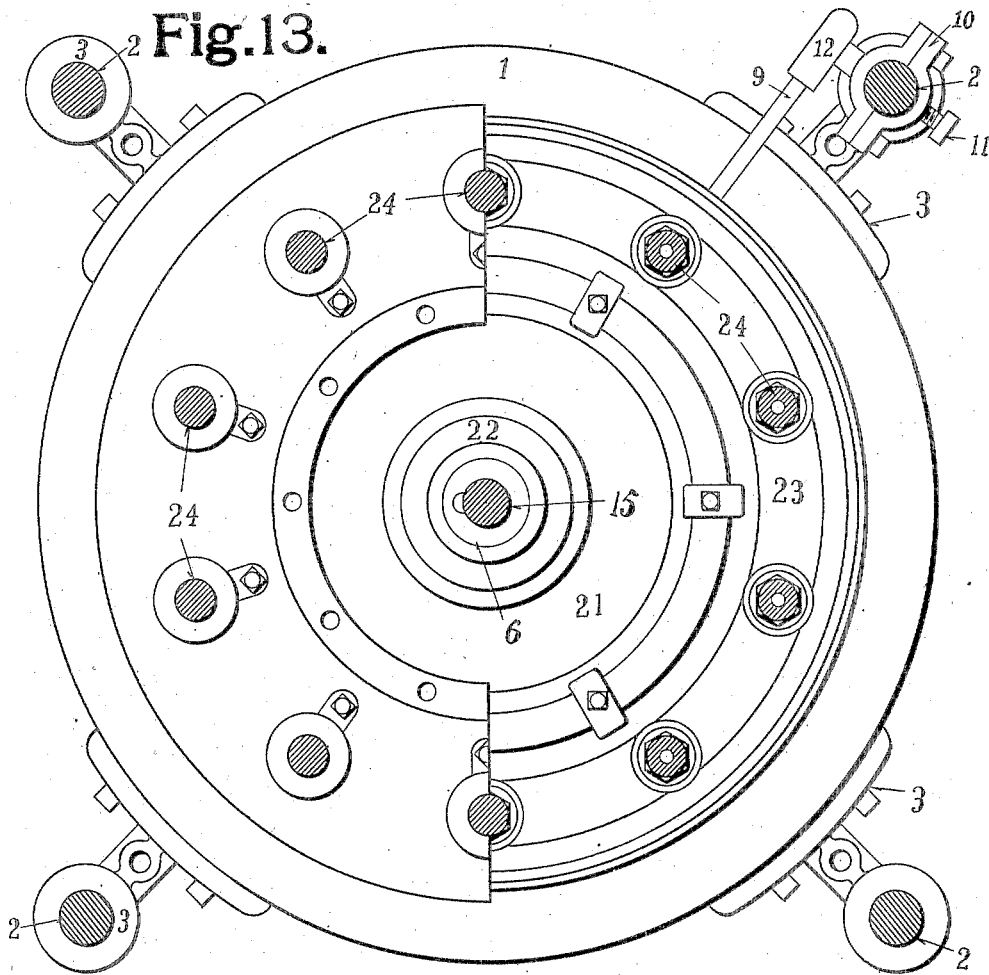

May 7, 1929.  C. T. SMALL  1,712,234
CAN CAPPING MACHINE
Filed April 4, 1927  10 Sheets-Sheet 10
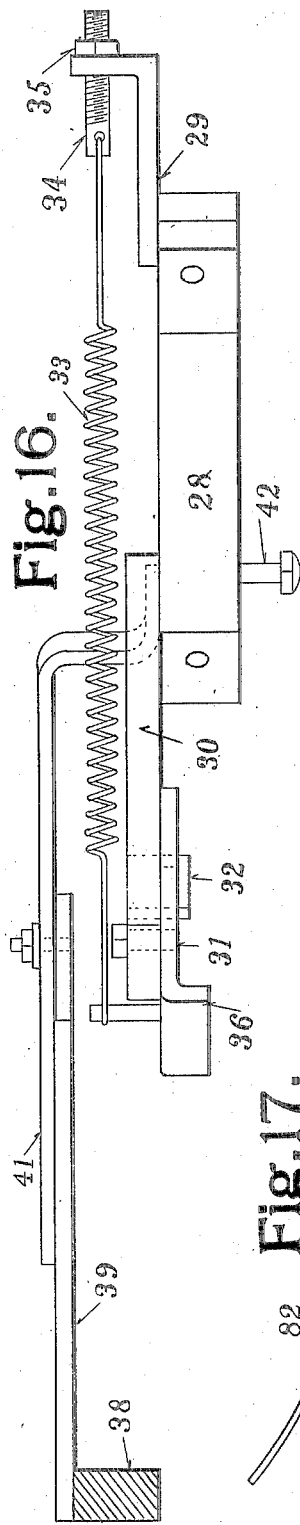
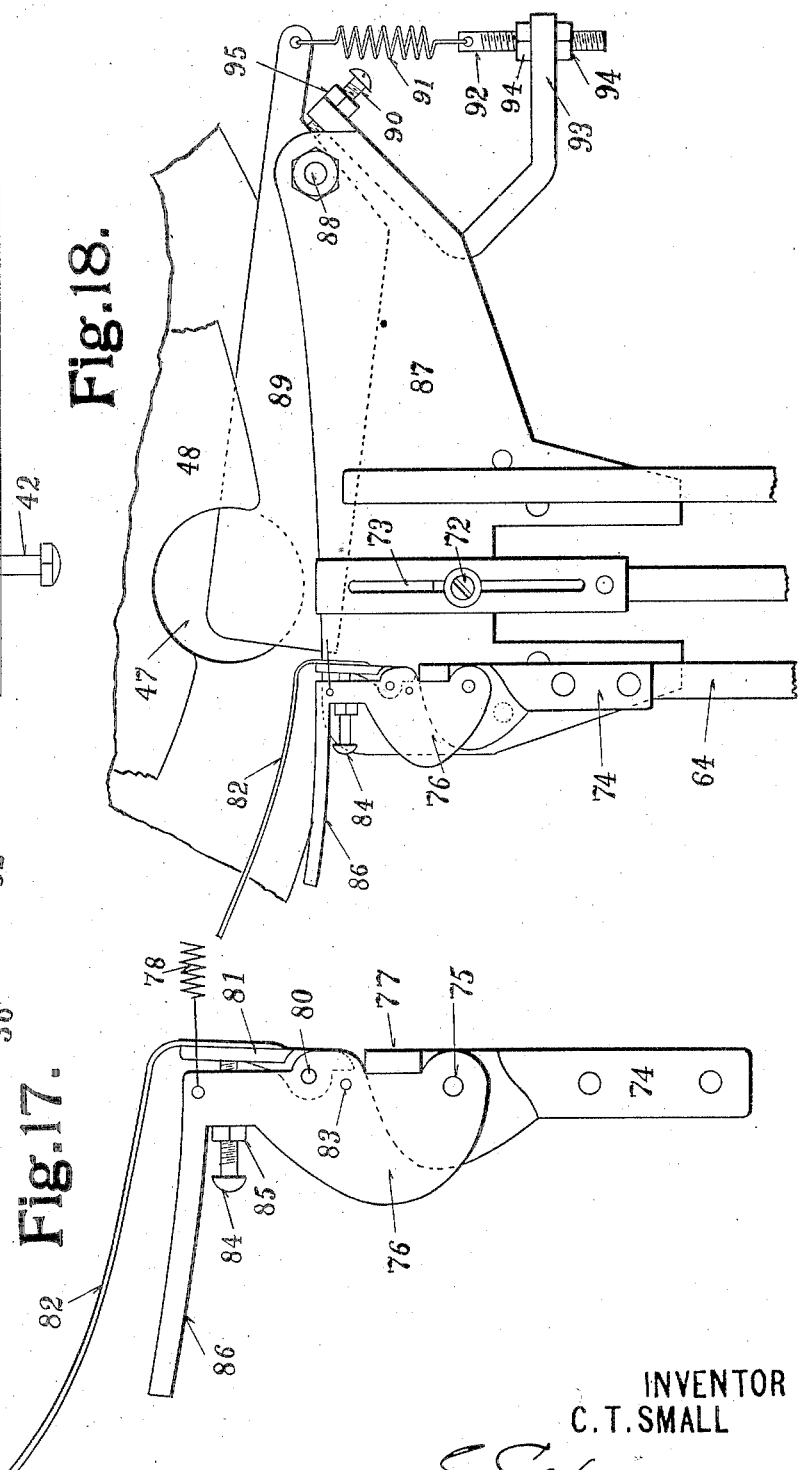
INVENTOR
C. T. SMALL
BY E. E. Huffman
ATTORNEY Patented May 7, 1929.

1,712,234

UNITED STATES PATENT OFFICE.

CHESLEY T. SMALL, OF ST. LOUIS, MISSOURI.

CAN-CAPPING MACHINE.

Application filed April 4, 1927. Serial No. 180,648.

My invention relates to improvements in the general type of machine shown in my application for patent Serial No. 88,765, filed February 17, 1926. While most of the novel features of the present invention consist in changes in this type of machine to adapt it to applying slip covers to cans, some of the features are applicable to filling machines or other machines for performing various operations on cans or similar receptacles.

Figure 1:
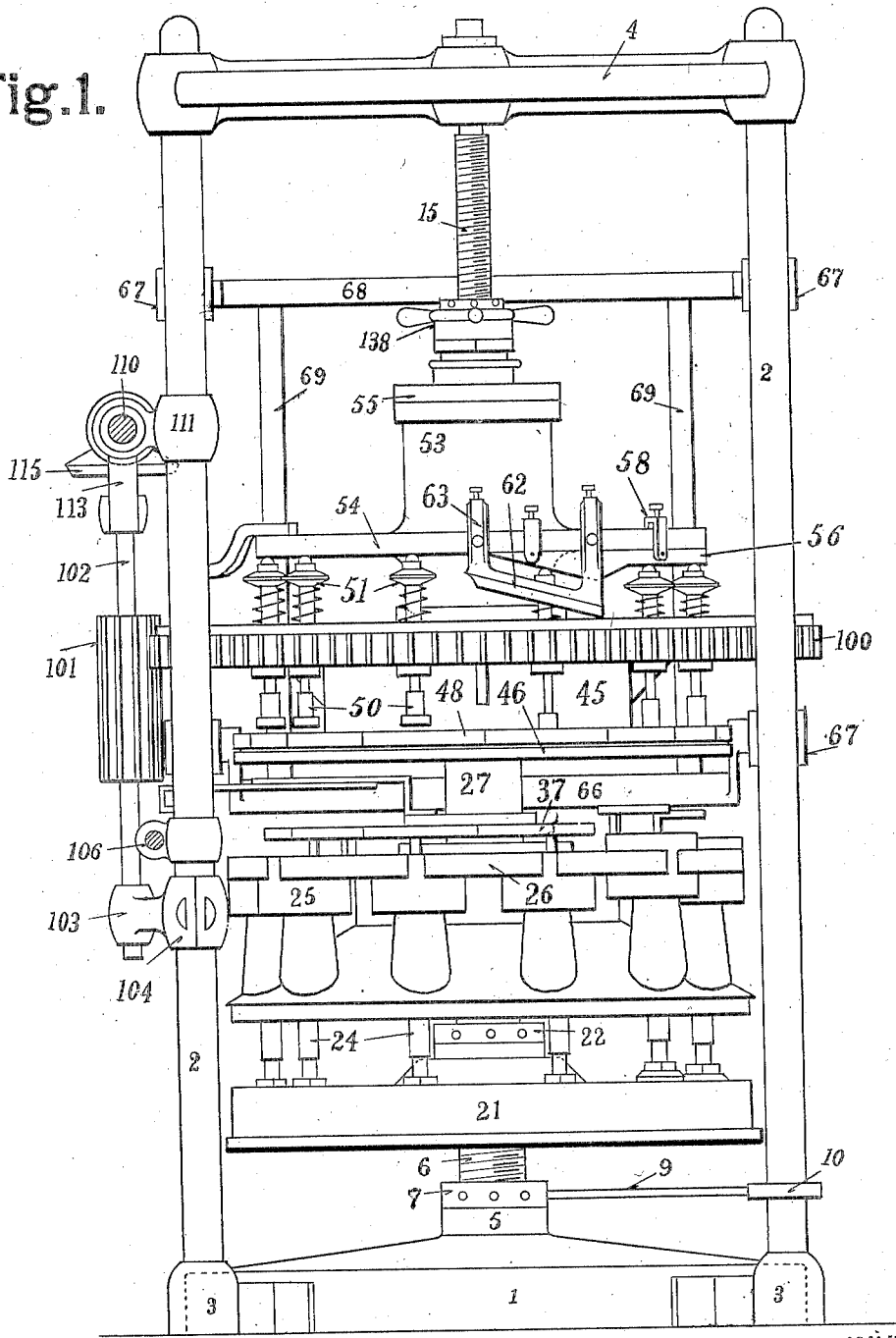
Figure 2:
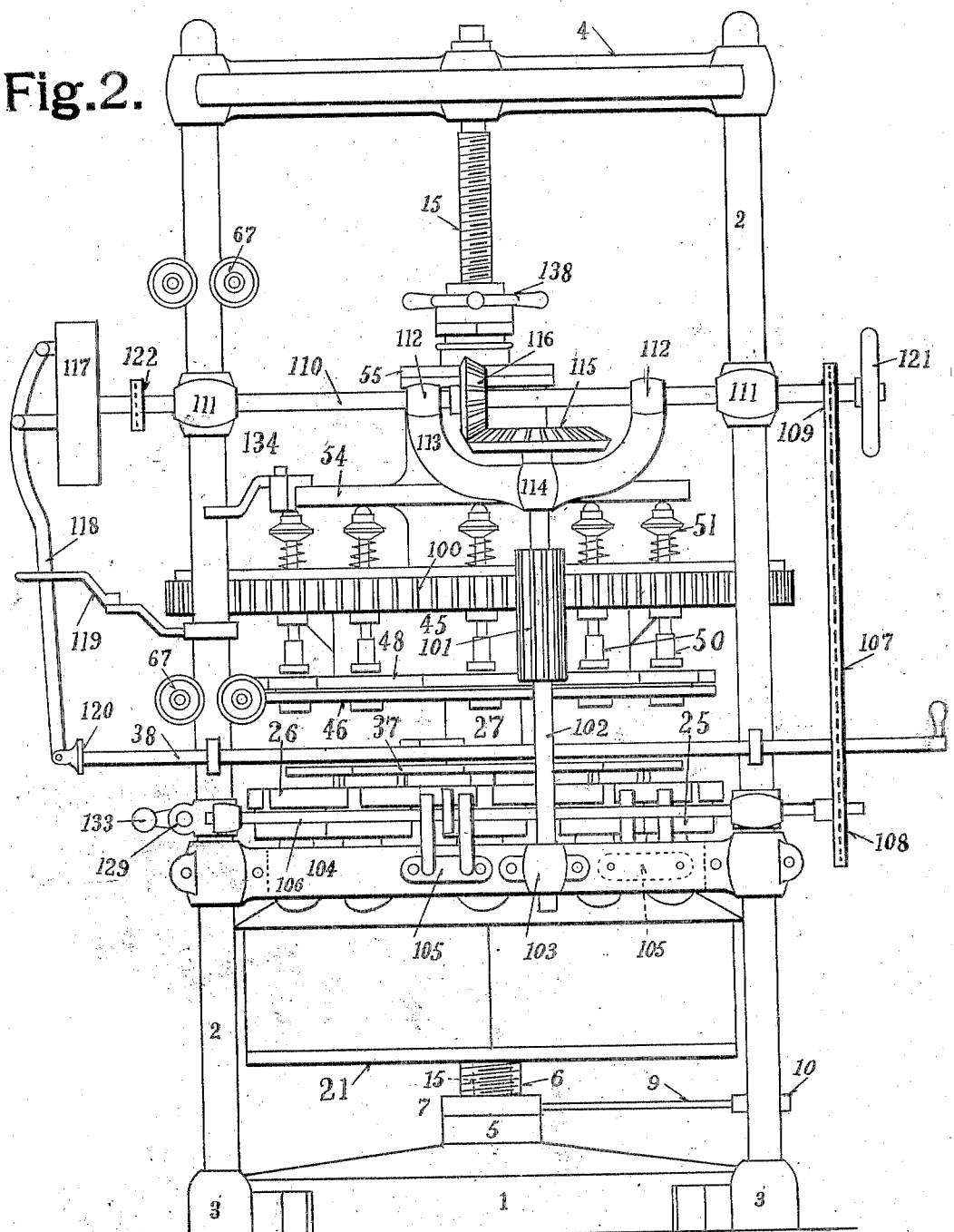
Figure 3:
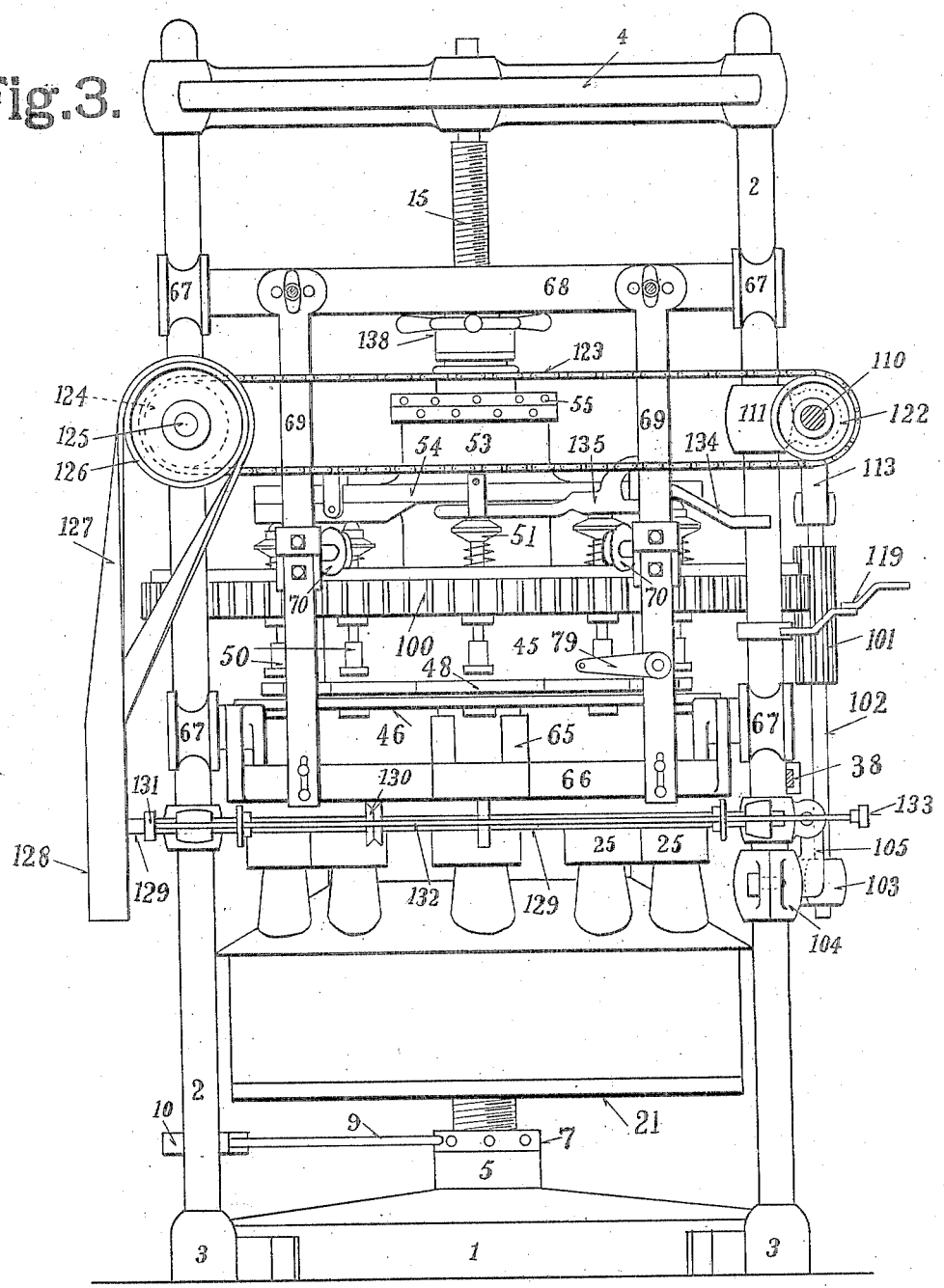
Figure 4:
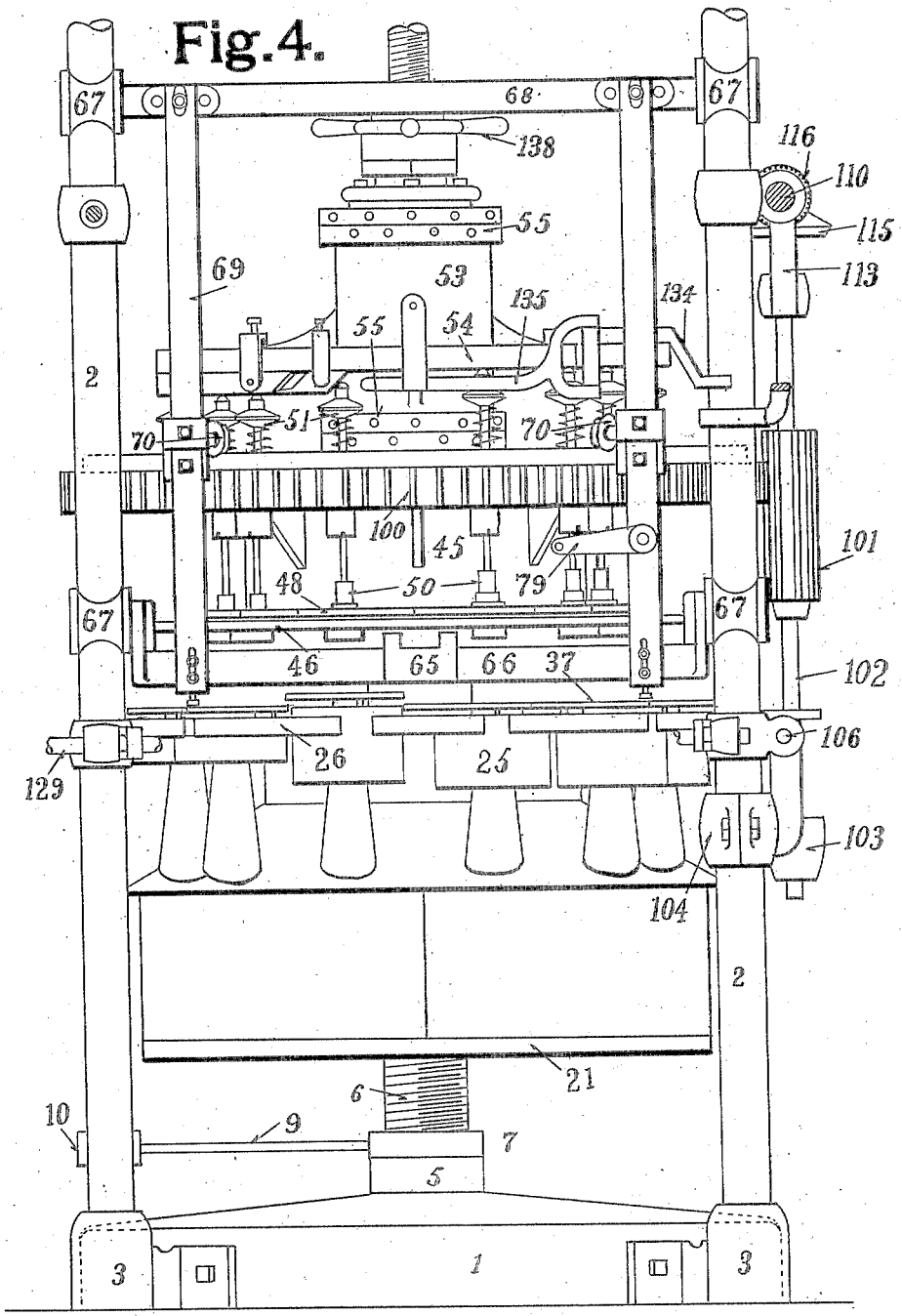
Figure 9:
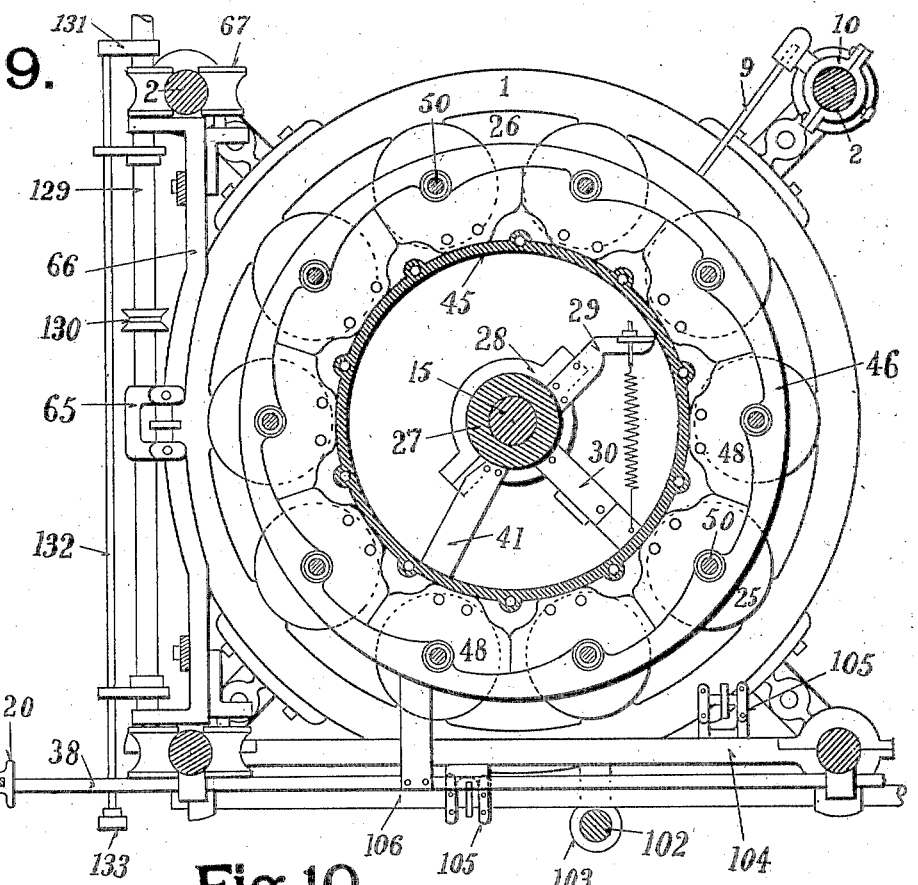
Figure 10:
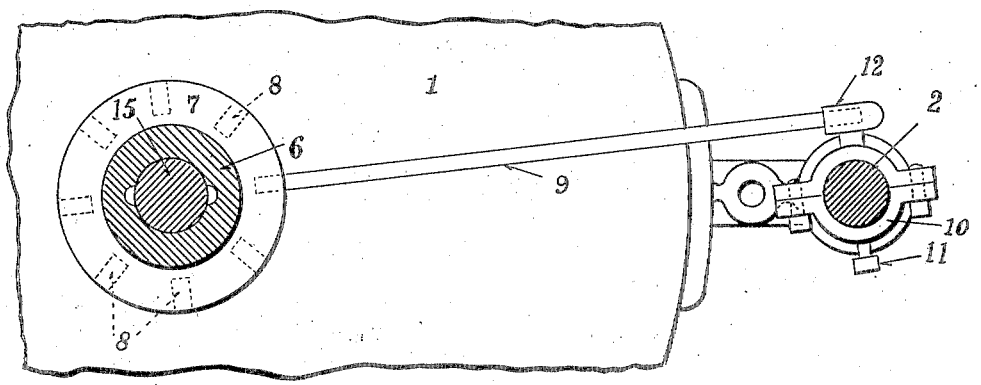
Figure 11:
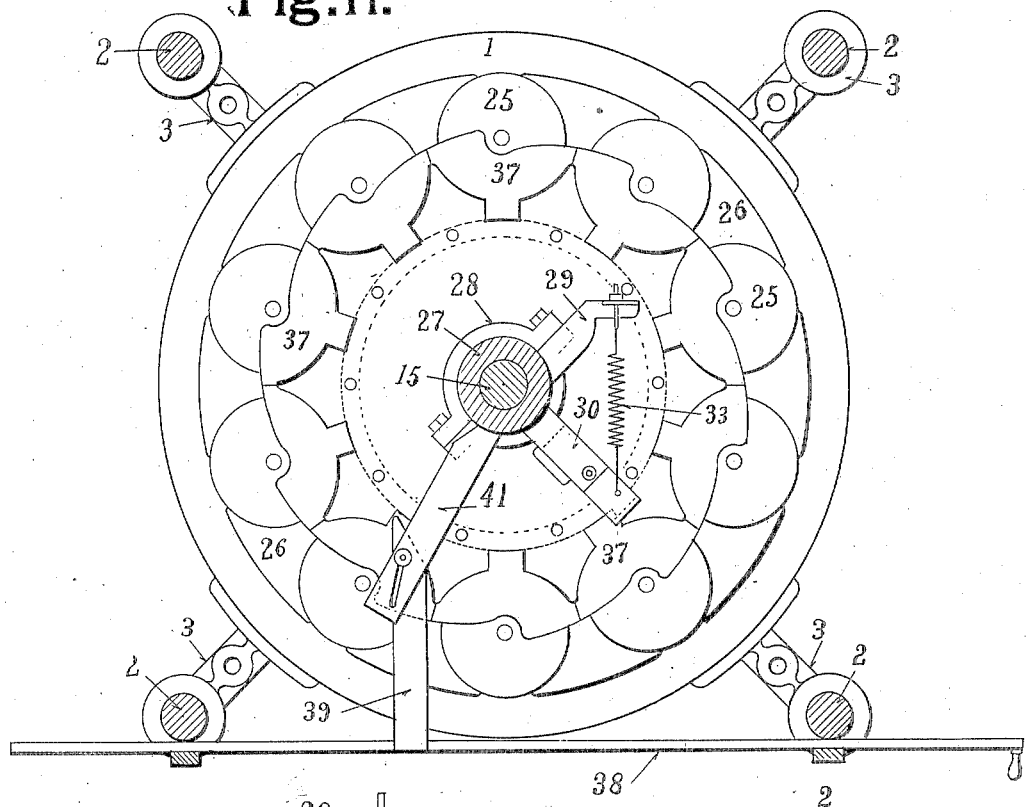
Figure 12:
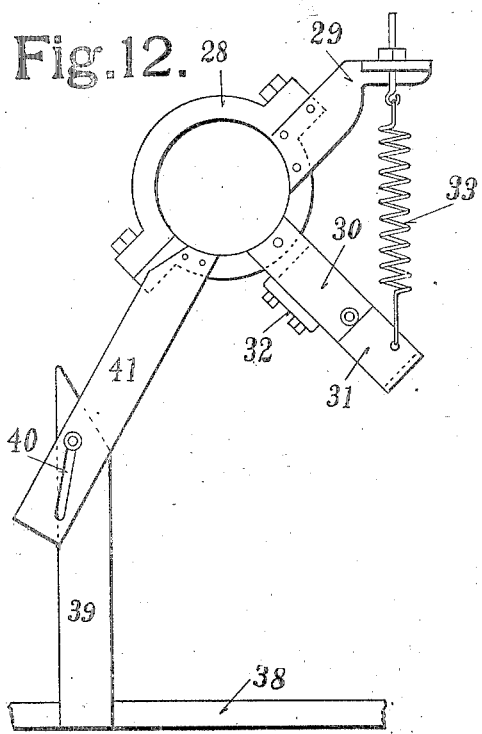

In the accompanying drawings, which illustrate one form of machine made in accordance with my invention, Figure 1 is a front elevation; Figure 2 is a side elevation; Figure 3 is a rear elevation; Figure 4 is an enlarged rear view of the lower part of the machine, some of the parts being broken away; Figure 5 is a vertical central section, the upper part of the machine being omitted; Figure 6 is a top plan view, the top spider and some of the other supporting parts being omitted for greater clearness; Figure 7 is an enlarged development of the cam track; Figure 8 is a section taken on the line 8—8 of Figure 7; Figure 9 is a section taken on the line 9—9 of Figure 5; Figure 10 is an enlarged sectional view showing the means for locking the lower adjustment of the central column; Figure 11 is a section taken on the line 11—11 of Figure 5; Figure 12 is an enlarged detail view of the clutch control mechanism; Figure 13 is an enlarged section taken on the line 13—13 of Figure 5; Figure 14 is a vertical section through the lower part of the central column; Figure 15 is a section taken on the line 15—15 of Figure 14; Figure 16 is an enlarged side view of the clutch control mechanism; Figure 17 is an enlarged detail of the cap seating finger; and Figure 18 is an enlarged plan view of the cap delivery mechanism.

The frame work of the machine is similar to that shown in my prior application, above referred to, and consists of a base 1, four uprights 2 secured to the base by feet 3 and a top spider 4. Formed on the base 1 is a central hub 5 in the bore of which is an externally threaded sleeve 6 which may be adjusted vertically by means of a nut 7 having formed in its periphery a number of recesses 8 adapted to receive one end of a lock bar 9. Surrounding one of the uprights 2 is a collar 10 (Figure 10) provided with a set screw 11 and a thimble 12 recessed to receive the end of the lock bar 9. This construction enables me to effectively lock the adjusting nut 7 so that the vibration of the machine will not disturb the vertical adjustment of the sleeve 6. The lower end of the sleeve 6 is closed by a cap 13 in the upper face of which is formed a ball race to receive balls 14, preferably four in number, forming an anti-friction bearing to support the main shaft 15 of the central column. A hardened block 16, provided with a ball race, is placed between the end of the shaft and the balls. It will be understood that a similar hardened block may be placed below the balls to obviate hardening the cap 13. In order to lubricate and at the same time clean the bearing I provide the bore of the sleeve with a groove 17 terminating at a point intermediate of its length in a grease nozzle 18, and at the opposite side with a groove 19 extending to the top of the sleeve. Thus grease forced into the nozzle by any suitable means, such as a grease gun, must travel down along the shaft, through the bearing and up along the opposite side carrying with it any foreign matter in the bearing. Surrounding the sleeve 6 is the hub 20 of an oil pan 21 adjustable in height by nuts 22 and provided with a track 23 for raising and lowering plungers 24 carrying individual can supports 25 of the can table 26. The can table 26 is carried by a sleeve 27 mounted on and rotating with the shaft 15. Surrounding the sleeve 27 is a collar 28 (Figures 11, 12 and 16) by which is carried two arms 29 and 30 substantially at right angles to each other. Pivoted to the arm 30 is a lever 31 normally held against a stop 32 by a coil spring 33 attached at one end to said lever and at the other end to a short threaded rod 34 passing through an opening in the upturned end of the arm 29 and engaged by a nut 35 by means of which the tension of the spring may be regulated. Formed on the end of the lever 31 is a downturned lip 36 terminating just above the can guides 37 when they are in their lowered position. Carried in guides secured to two of the uprights 2 is a sliding bar 38 having an arm 39. A pin in this arm extends through a slot 40 in an arm 41 secured to the collar 28 so that movement of the collar around the shaft will cause the bar 38 to slide longitudinally in its guides. The collar 38 is supported at the proper height by a stud 42 bearing on the flange of the sleeve 27 to which the can table is secured.

Surrounding and keyed to the sleeve 27 is a sleeve 43 attached to which is a toothed disk 44 forming the plunger support. Depending from the disk 44 is a drum 45, to the lower end of which is attached a cap disk 46 provided with cap openings 47 equal in number and concentric with the can supports 25. Arranged adjacent to the cap openings are cap guides 48 having their outer edges spaced from the cap disk to accommodate a cap supporting plate hereinafter to be described. Mounted on the disk 44 directly above the cap openings 47 are plunger guides 49 in each of which is a reciprocating plunger 50. Adjacent to its top end each plunger is provided with a disk 51 having conical upper and lower faces. Against the lower face of each of these disks bears a tapered coil spring 52 tending to raise the plunger. Surrounding the sleeve 43 is a sleeve 53 carrying a track 54. The sleeve 53 is capable of a slight longitudinal adjustment by means of nuts 55 engaging with threaded portions on the sleeve 43 so that the track may be positioned accurately with relation to the plungers. Carried on the track is a cam block formed of two parts 56 and 57 adapted to be adjusted along the track by means of clamps 58. The part 57 is provided with a tongue 59 overlapping the part 56 so that the effective length of the block may be varied. Adjacent to the end of the part 56 is a projection 60 terminating in an inclined face 61. Extending parallel with the face 61 is a lifting cam 62 secured to the track by clamps 63. This lifting cam is adapted to engage with the disks 51 and thus positively lift the plungers to their normal position as the springs 52 might fail to do this in the event of unusual friction on the plungers.

Caps are delivered to the cap disk 46 by a conveyor 64 (Figure 18) the end of which is carried on a bracket 65 (Fig. 9) forming part of a cross bar 66. On each end of the cross bar 66 are two grooved wheels 67 moving on one of the uprights 2 as a guide. Connecting the cross bar 66 with a second cross bar 68 are a pair of straps 69, the bar 68 being also provided with guide wheels 67. The two bars and two straps thus constitute a vertically movable carriage for supporting and positioning the inner end of the cap conveyor. In order that the carriage may be raised and lowered automatically with the cap disk when the latter is adjusted for cans of different heights, I support the carriage from the plunger disk 44 by means of a pair of wheels 70 on the straps 69. Carried on the center rail of the cap conveyor is a finger 71 which is adjustable by means of a screw 72 passing through a slot 73. Secured to the left hand side of the conveyor, adjacent to the finger 71 is a block 74. Pivoted to the block 74 at 75 is a second block 76 normally held against a stop 77 by a spring 78 secured at one end to a pin in the block 76 and at the other to an arm 79 on one of the straps 69. Pivoted at 80 to the block 76 is a finger 81 to which is secured a spring 82 forcing the caps into the recesses of the cap guides 48 to position them over the openings 47. Movement of the finger 81 on the pivot 80 is limited positively in one direction by a pin 83 and adjustably in the other by a screw 84 threaded in the block 76 and provided with a lock nut 85. A projection 86 on the block 76 extends adjacent to the spring 82 to prevent the latter from being bent so far as to permanently change its shape. Arranged between the cap conveyor and its supporting bracket is a landing plate 87 extended at one side to provide a pivot 88 for an auxiliary yielding landing plate 89 which projects over the opening 47, as shown in Figure 18, so as to support the cap while the plunger is brought down into engagement with it. The plate 89 is held against an adjustable stop 90 by a spring 91 attached at one end to the plate and at the other to a threaded rod 92 passing through an opening in a tail piece 93 carried by the plate 87. Nuts 94 engage the rod 92 at each side of the tail piece and provide means for varying the tension of the spring. The screw stop 90 enables the normal position of the plate 89 to be varied for different sizes of caps and a lock nut 95 serves to secure it in position.

The plunger disk 44 is provided on its periphery with teeth 100 meshing with a pinion 101 on a shaft 102. This shaft is journaled at its lower end in a box 103 carried on a cross bar 104 clamped to the uprights 2 and carrying brackets 105 for the can conveyor. As the conveyors are the same as those shown in my filling machine, above referred to, they have not been shown here. They are actuated from a shaft 106 driven by a sprocket chain 107 passing around a sprocket wheel 108 on said shaft and a sprocket wheel 109 on a shaft 110 journaled in boxes 111 clamped to the uprights 2. This shaft passes through bearings 112 of a yoke 113 also provided with a bearing 114 for the upper end of the shaft 102. On the shaft 102 is a bevel gear wheel 115 meshing with a bevel gear wheel 116 on the shaft 110. Mounted on one end of the shaft 110 is a combined clutch and driving pulley 117 by means of which power is applied to the machine. The handle 118 of the clutch travels in a guide bracket 119 secured to one of the uprights and terminating in a shoe 120 against which bears the end of the sliding bar 38. A hand wheel 121 provides means for manually operating the machine.

Mounted on the shaft 110 is a sprocket wheel 122 around which passes a sprocket chain 123 also passing around a sprocket wheel 124 on a stud 125 carried on the upright 2. The sprocket wheel 124 is secured to a pulley 126 connected by a bolt 127 to a pulley 128 on a shaft 129 which drives the cap conveyor, hereinbefore referred to. A pulley 130 on this shaft drives a cap feeding device (not shown) for delivering caps to the conveyor. In order that the cap conveyor may be thrown out of operation without stopping the machine the pulley 128 is connected to the shaft 129 by means of a clutch 131, preferably operated by a rod 132 extending to the front of the machine and provided with a hand knob 133. A bracket 134 secured to the cam track 54 engages one of the uprights 2 to prevent rotation of the track. Pivoted to this bracket is a lever 135 provided with a cam face 136 in the path of the plungers 50. Extending from this lever to the cap feeding device (not shown) is a feed control rod 139.

The sleeve 27 is secured to the shaft 15 by a set screw 137 and the sleeve 43 is raised or lowered by means of a hand wheel 138, as in my prior application above referred to. The other parts not described in detail will be understood to be similar to those shown and described in said application.

The operation of my machine, briefly described is as follows: Cans are fed onto the can table 26 and into the recesses of the guides or holders 37 by the can conveyor (not shown) carried by the left hand bracket 105 (Figures 2 and 9). This can table is rotated in a clockwise direction to bring the cans in line with the cap conveyor 64 where a cap is fed into the cap disk 46 and into the recess of the holder 48 so as to be positioned directly over the can. Plate 89 supports the cap at this point and so prevents it from immediately dropping into the opening 47. As the cap is carried forward the spring 82 insures its proper seating in the recess of the holder. At the same time the can is raised into the cap disk 46 by the action of the track 23 on the plunger 24 of the can support 25 carrying the can and the corresponding cap plunger 50 is lowered by the action of the cam block 57. The cap is thus forced on the can and the parts remain in this relation as they travel forward until the cap plunger comes in contact with the projection 60 of the cam block 56 and is forced downwardly. At the same time the can plunger 24 is lowered by reaching the end of the raised part of the track 23 and thus the capped can is forced out of the cap disk and returned to normal position. Spring 52 now raises the cap plunger as it contacts with the inclined face 61. Should the spring for any reason prove insufficient for the purpose the lifting cam 62 will insure this action. The capped can is now carried forward and discharged in the conveyor (not shown) on the right hand bracket 105. In case the can plunger fails to return to normal position or any other obstruction occurs on the can table such obstruction will strike the lip 36 on lever 31 causing collar 28 to rotate. This movement is communicated through slotted arm 41 and arm 39 to the sliding bar 38 and thence to the clutch lever 118 throwing the clutch out to stop the machine. Should the machine not stop at once on account of the momentum of the moving parts so when the bar 38 has reached the end of its movement pressure on the lip 36 overcomes the tension of the spring 33 and the lever 31 turns on its pivot allowing the obstruction to pass without injury to the mechanism.

Having fully described my invention, what I claim as new and desire to secure by Letters Patent of the United States is:

1. In a device of the class described, the combination with a can table, of a cap table above said can table, cap plungers, a cam track, and a pair of relatively adjustable cam blocks carried by said track and actuating said plungers.

2. In a device of the class described, the combination with a can table, of a cap table above said can table, cap plungers, a cam track, and a pair of relatively adjustable cam blocks carried by said track and actuating said plungers, one of said cam blocks being provided with a lip overlapping the other.

3. In a device of the class described, the combination with a can table, of a cap table above said can table, cap plungers, a cam track cooperating with said plungers to depress the same, springs for returning said plungers, and means adjustable relatively to and operating independently of the track for engaging with and positively raising the plungers.

4. In a device of the class described, the combination with a can table, of a cap table above said can table, cap plungers, disks on said plungers lying in a plane at right angles to their axes, a cam track cooperating with said plungers to depress the same, and a lifting cam adjustable relatively to and operating independently of the track and engaging said disks for positively raising the plungers.

5. In a device of the class described, the combination with a can table, of a cap table above said can table, cap plungers provided with beveled annular projections lying in a plane at right angles to their axes, a cam track cooperating with said plungers to depress the same, and a lifting cam adjustable relatively to and operating independently of said track for engaging with the projections on the plungers.

6. In a device of the class described, the combination with a can table, of a cap table above said can table, cap plungers, a cam track, a cam block adjustably mounted on said track and cooperating with said plungers, and a lifting cam also adjustably mounted on said track to raise the plungers.

7. In a device of the class described, the combination with a can table, of a cap table above said can table, cap plungers, a cam track, a bracket for preventing rotation of said track, a lever pivoted to said bracket and projecting in the path of said plungers, and a cap feed control connection actuated by said lever.

8. In a device of the class described, the combination with a central shaft, of a sleeve surrounding said shaft and carrying a can table, a second sleeve surrounding said first named sleeve and keyed thereto, a cap table carried from said second sleeve, plungers for said cap table, a non-rotary collar surrounding said second sleeve, and a cam track carried by said collar for actuating said plungers to apply caps to the cans on said table.

9. In a device of the class described, the combination with a central shaft, of a sleeve surrounding said shaft and carrying a can table, a second sleeve surrounding said first named sleeve and keyed thereto, a cap table carried from said second sleeve, plungers for said cap table, a non-rotary collar surrounding said second sleeve, means for adjusting said collar longitudinally on said sleeve, and a cam track carried by said collar for actuating said plungers to apply caps to the cans on said table.

10. In a device of the class described, the combination with a central shaft, of a sleeve surrounding said shaft and carrying a can table, a second sleeve surrounding said first named sleeve and keyed thereto, a plunger disk carried by said second named sleeve, a cap table suspended from said plunger table, plungers in said plunger table, a non-rotary collar surrounding said second named sleeve, and a cam track carried by said collar for actuating said plungers to apply caps to the cans on the can table.

11. In a device of the class described, the combination with a central shaft, of a sleeve surrounding said shaft, a can table carried by said sleeve, a collar on said sleeve, an arm carried by said collar and extending above the can table to rotate said collar when engaged by an obstruction, and a clutch control actuated by said collar.

12. In a device of the class described, the combination with a central shaft, of a sleeve surrounding said shaft, a can table carried by said sleeve, a collar on said sleeve, an arm carried by said collar, a pivoted lever also carried by said collar, a spring extending between said lever and arm, and a clutch control actuated by said collar.

13. In a device of the class described, the combination with a central shaft, of a sleeve surrounding said shaft, a can table carried by said sleeve, a collar on said sleeve, an arm carried by said collar, a pivoted lever also carried by said collar, a spring extending between said lever and arm, a clutch control, and a second arm carried by said collar and having a slotted connection with said clutch control.

14. In a device of the class described, the combination with a base, of a central sleeve in said base, an adjusting nut for raising and lowering said sleeve in said base, an upright adjacent to the base, and a lock bar extending between said upright and nut for preventing the rotation of the latter.

15. In a device of the class described, the combination with a base, of a central sleeve in said base, an adjusting nut provided with recesses in its periphery for raising and lowering said sleeve in said base, an upright adjacent to the base, a collar on said upright provided with a recess, and a lock bar engaging with the recess in said collar and one of the recesses in the nut.

16. In a device of the class described, the combination with a base, of a central sleeve in said base, an adjusting nut provided with recesses in its periphery for raising and lowering said sleeve in said base, an upright adjacent to the base, a collar on said upright, a thimble carried by said collar, means for locking the collar against rotation, and a lock for engaging with said thimble and with one of the recesses in the nut.

17. In a device of the class described, the combination with a base, of a central sleeve in said base, a shaft in said sleeve, an anti-friction bearing in said sleeve and supporting said shaft, and means for forcing lubricant through said bearing to clean the same.

18. In a device of the class described, the combination with a base, of a central sleeve in said base, a shaft in said sleeve, an anti-friction bearing in said sleeve and supporting said shaft, said sleeve having a lubricant inlet passage intermediate of its length, and a lubricant outlet passage leading from the bearing to the upper end of the sleeve.

19. In a device of the class described, the combination with a base, of a central sleeve in said base, a shaft in said sleeve, an anti-friction bearing in said sleeve and supporting said shaft, said sleeve having a lubricant inlet passage intermediate of its length, a lubricant outlet passage leading from the bearing to the upper end of the sleeve, and an oil pan surrounding said sleeve above said lubricant inlet passage to receive the lubricant forced through the bearing.

20. In a device of the class described, the combination with a central shaft, of a can table supported from said shaft, a cap table above the can table, a cap chute for feeding caps to said table, and a cap positioning device comprising a pivoted member, and a resilient cap seating member pivoted to said first named member.

21. In a device of the class described, the combination with a central shaft, of a can table supported from said shaft, a cap table above the can table, a cap chute for feeding caps to said table, and a cap positioning device comprising a pivoted member, and a cap seating member pivoted to said first named member.

22. In a device of the class described, the combination with a central shaft, of a can table supported from said shaft, a cap table above the can table, a cap chute for feeding caps to said table, and a cap positioning device comprising a pivoted member, a cap seating member pivoted to said first named member, and an adjustable stop for limiting the relative movement of said members.

23. In a device of the class described, the combination with a central shaft, of a can table supported from said shaft, a cap table above the can table, a cap chute for feeding caps to said table, and a cap positioning device comprising a pivoted member, a fixed stop for limiting the relative movement of said member in one direction, and an adjustable stop for limiting said movement in the other direction.

24. In a device of the class described, the combination with a central shaft, of a can table supported from said shaft, a cap table above the can table, a cap chute for feeding caps to said table, and a cap positioning device comprising a pivoted member, a resilient cap seating member pivoted to said first named member, and an extension on said first named member forming a backing for said resilient member.

25. In a device of the class described, the combination with a cap table having cap openings, of cap holders on said table but spaced therefrom adjacent to said openings, a yielding cap supporting plate extending into the space between said table and holders, and a plunger for forcing the caps through the openings in said table.

26. In a device of the class described, the combination with a cap table having cap openings, of cap holders on said table but spaced therefrom adjacent to said openings, a yielding cap supporting plate extending into the space between said table and holders, adjustable means for limiting the movement of said plate, and a plunger for forcing the caps through the openings in said table.

27. In a device of the class described, the combination with a cap table having cap openings, of cap holders on said table but spaced therefrom adjacent to said openings, a pivoted plate projecting into the space between said table and holders, a spring holding said plate in normal position, and means for adjusting the tension of said spring.

28. In a device of the class described, the combination with a rotary can table, of individual can supports movable vertically relative to said table, can guards carried by said supports, each of said guards having a can receiving recess and a can engaging portion, and a continuous cam face connecting the can engaging portion of each guard with the recess of an adjacent guard.

In testimony whereof, I hereunto affix my signature, this 25th day of March, 1927.

CHESLEY T. SMALL.